United States Patent
Hartmann

(10) Patent No.: US 7,752,091 B2
(45) Date of Patent: Jul. 6, 2010

(54) FLEXIBLE ASSIGNMENT SCHEME FOR FINANCIAL STATEMENT ITEMS IN AN AUTOMATED ACCOUNTING SYSTEM

(75) Inventor: Bernd Hartmann, Walldorf (DE)

(73) Assignee: SAP AG, Walldorf (DE)

( * ) Notice: Subject to any disclaimer, the term of this patent is extended or adjusted under 35 U.S.C. 154(b) by 1381 days.

(21) Appl. No.: 10/855,316

(22) Filed: May 28, 2004

(65) Prior Publication Data

US 2006/0010048 A1    Jan. 12, 2006

(51) Int. Cl.
*G07B 17/00* (2006.01)
*G06Q 40/00* (2006.01)

(52) U.S. Cl. .......................................... 705/30; 705/35
(58) Field of Classification Search .............. 705/30–35
See application file for complete search history.

(56) References Cited

U.S. PATENT DOCUMENTS 5,875,435 A * 2/1999 Brown .......................... 705/30
7,117,172 B1 * 10/2006 Black .......................... 705/35

* cited by examiner

*Primary Examiner*—F. Ryan Zeender
*Assistant Examiner*—Denisse Ortiz Roman
(74) *Attorney, Agent, or Firm*—Kenyon & Kenyon LLP

(57) ABSTRACT

An automated accounting and reporting system supports flexible assignments of accounting objects to financial statements. At a reporting time, financial statement items may be generated from accounting objects by surveying the stored accounting objects and copying and aggregating key figures from the accounting object to the financial statement items. The financial statement items form the basis of the financial statements. The copying and aggregating may occur as specified in a plurality of rule sets. To change assignments between the accounting objects and financial statements, it is sufficient to provide a replacement rule set that specifies different copy and aggregation operations.

13 Claims, 2 Drawing Sheets

100

200

300

400

FLEXIBLE ASSIGNMENT SCHEME FOR FINANCIAL STATEMENT ITEMS IN AN AUTOMATED ACCOUNTING SYSTEM

BACKGROUND

The present invention relates to computerized accounting systems and to reporting sub-systems therein.

Most modern firms use computers to monitor their financial operations. These firms generate computerized records that represent various transactions that the firm performs during the course of its operation. For example, banks typically store electronic records representing various loans that they manage and securities that they buy and sell. For large firms, there may be several million electronic records generated per year during the ordinary course of the firms' operations. These computer systems also may perform financial analysis and reporting functions to support internal accounting operations and the like.

In one reporting process, a computer system may generate financial statements from its transaction records. A variety of financial statements conventionally are prepared in accounting, such as balance sheet statements, profit/loss statements, a variety of notes and internal reports. Known computer systems require an operator to assign a transaction to a general ledger account at the time that the transaction is "posted," e.g., when the posting document representing the transaction is created and stored in the computer system. Financial statement are directly based on these general ledger accounts. In this manner, a transaction's financial statement assignment is directly linked to the transaction record itself. When the time comes for the computer system to generate financial statements, the computer system assembles the financial statements using the hard coded assignments present in the transaction records.

The hard coding of financial statement assignments is cumbersome and inflexible. Some companies experience changes in their structure or legal type (e.g., from a bank to a capitalized company), which can cause the form and format of their reporting structures to change. Although the key figures of the postings themselves would remain correct, the financial statement assignments would become obsolete. Changes in the legal type or in the country where a firm is located also may affect the reporting of their business partners. It is very common to report e.g. which portion of the receivables is from banks or non-banks, which portion is from domestic and from foreign business partners. In such a case additional postings have to be made in order to reflect the change of country of a business partner. Known systems support only in rare cases the creation of mass postings. Accordingly, manual postings often are required. The applicant perceives a need in the art for an automated accounting and reporting system that provides flexible assignments between stored accounting records and financial statements prepared therefrom.

DETAILED DESCRIPTION

Embodiments of the present invention provide an automated accounting and reporting system that supports flexible assignments of key figures of accounting objects to financial statements. According to these embodiments, accounting objects may be posted to a financial database without requiring general ledger accounts or financial statement assignments also to be stored therein. At a reporting time, financial statement items may be generated by surveying the stored accounting objects and copying key figures from the accounting object to the financial statement items and aggregating data therein. The financial statement items form the basis of the financial statements. The copying and aggregating may occur as specified in a plurality of rule sets. To change assignments between the accounting objects and financial statements, it is sufficient to provide another rule set that specifies different copy and aggregation operations.

Figure 1:
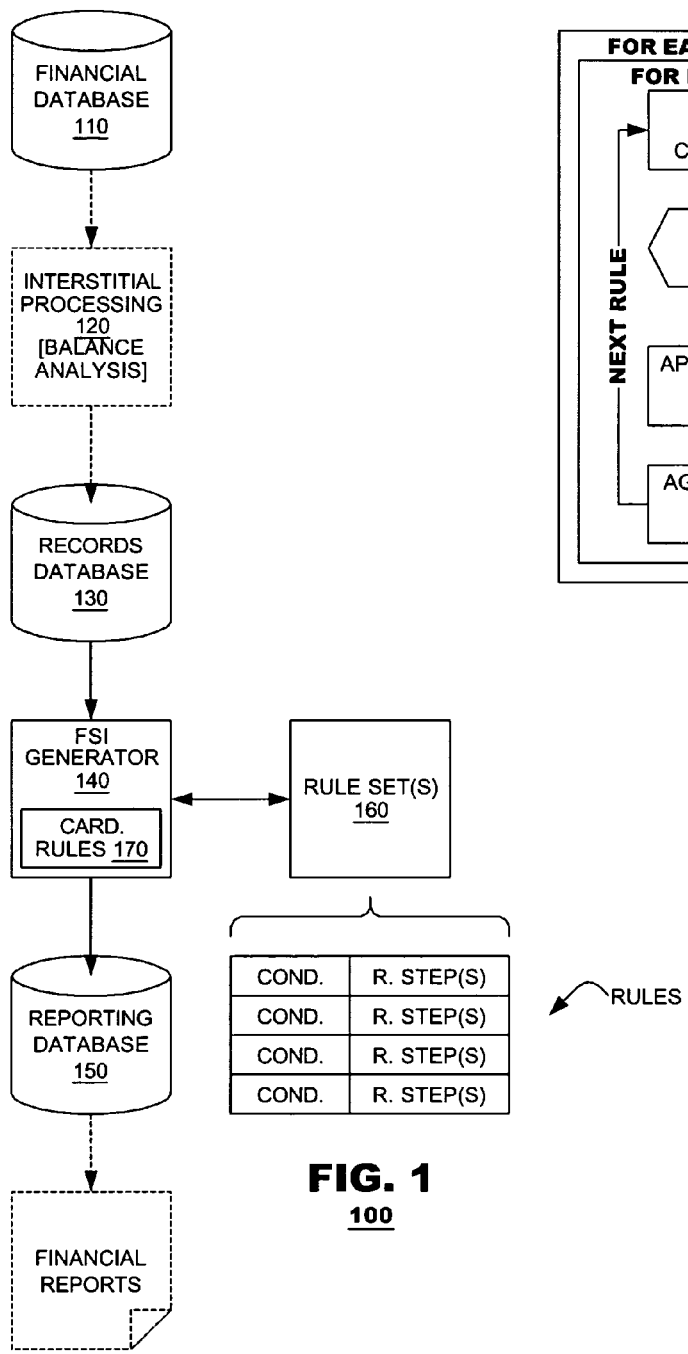
FIG. 1 is a simplified functional block diagram of a computerized accounting system according to an embodiment of the present invention.

FIG. 1 is a simplified functional block diagram of a computerized accounting system 100 according to an embodiment of the present invention. As shown, the accounting system 100 may include a financial database 110 to store records of financial transactions and/or balances of a firm. The system also may include one or more processing systems 120 and databases 130 to store processed data. For example, in the co-pending application Ser. No. 10/855,513 entitled "Balance Processor for Automated Accounting System Employing Merging and Consistency Checks," filed May 28, 2004, there is disclosed a balance processor to analyze financial records prepared according to a primary accounting system and generate or supplement financial records prepared according to a secondary accounting system. Similarly, processing systems may perform maturity grouping, netting calculations and calculation of additional statistical values, among others. For the purposes of the present discussion, such operations may be subsumed under the rubric of an 'interstitial processor' 120 and records generated therefrom may be stored in a records database 130.

Embodiments of the present invention provide a financial statement item generation process ("FSI generator") 140 that surveys records present in the records database 130 or, alternatively, the financial database 110 (herein, such records are called "accounting objects") and generates financial statement items therefrom. The financial statement items ("FSIs") may be stored in a reporting database 150. Typically, the records present in the reporting database 150 form the basis of financial statements, electronic or printed reports, that the firm generates in the course of its operations.

The FSI generator 140 may operate in conjunction with one or more rule sets 160, which define conditions upon which FSIs may be generated from stored accounting objects. Each rule may include a condition field which identifies the types of accounting objects to which the rule is relevant. Also complex conditions based on any logical expression combining elementary conditions on characteristics as well as on key figures are permissible. Each rule also may include a rule steps field that identifies operations to be performed on key figure data from the accounting object to generate a corresponding FSI.

The system 100 may accommodate multiple rule sets 160. Each rule set defines operations that are to be performed to generate FSIs from the accounting objects. Typically, the different rule sets may define different reporting systems that a firm might use for different firm structures. For example, if a firm were operating as a bank, it would be subject to predetermined reporting requirements for its financial positions data. If the firm changed its operating structure to that of a capitalized company, the form and format of its reporting requirements likely would change. In the system 100 of FIG. 1, different rule sets might be defined to accommodate the different reporting requirements. During operation, one of the rule sets would be selected to generate FSIs from the stored accounting objects.

As can be appreciated, the rule sets 160 define relationships between FSIs and the accounting objects from which they are generated. The relationships typically will be many to many. That is, a single accounting object may match conditions for multiple rules of a rule set and, therefore, contribute to generation of multiple FSIs. Additionally, a single FSI may receive contributions from multiple accounting objects.

Figure 2:
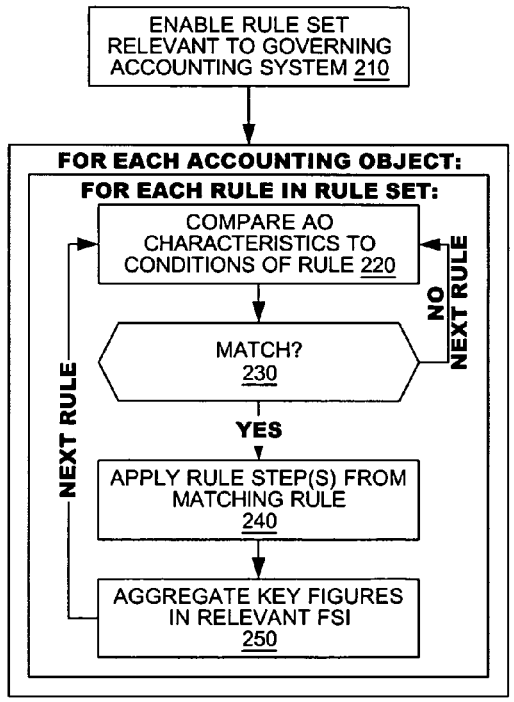
FIG. 2 illustrates a method according to an embodiment of the present invention.

FIG. 2 illustrates a method 200 according to an embodiment of the present invention. The method may begin by enabling a rule set for use in generating FSIs (box 210). Thereafter, for each stored accounting object, the system compares characteristics and key figures of the accounting objects against conditions specified for each rule in the enabled rule set (box 220). If the characteristics and key figures match a rule condition (box 230), the system may apply rule steps from the matching rule (box 240). Often, the rule steps cause key figure data from the accounting object to be copied and aggregated into a FSI (box 250). The operations of boxes 220-250 continue for each rule in the rule set. Thereafter, the method advances to another accounting object and repeats its operation. These operations may continue until every accounting object is compared to every rule in the rule set.

The method of FIG. 2 finds application where the system is run to develop FSIs for the most complete financial reporting possible. Of course, scenarios may arise where a system operator needs only to generate FSI for a subset of financial reports or may desire to generate financial reports for only a subset of stored accounting objects. In such situations, it is permissible to run the operations of FIG. 2 on some but not all of the stored accounting objects or to enable some but not all of the rules in a rule set. The principles of the present invention accommodate such variations.

Consider operation of the foregoing embodiments in connection with exemplary accounting objects and rules set forth in Table 1 and Table 2. Table 1 provides a simple example of exemplary accounting objects that might be stored in one of the databases 110 or 130. Here, the accounting objects reflect balances of bank transactions. Each accounting object includes fields to record characteristics data or key figure data. "Key figures" are numbers representing parameter data of FOB records; they are the numbers that represent financial information to be reported by the system. "Characteristics" are semantic identifiers of key figure data; they may identify various parameters of records (e.g., object ID, security ID) or may provide for differentiation among reporting entities (e.g., a legal entity, a profit center, an instrument type).

TABLE 1

| | CHARACTERISTICS | | | KEY FIGURES | |
|---|---|---|---|---|---|
| ID | AO TYPE | COUNTRY CODE | CURRENCY CODE | BOOK VALUE | INTEREST REVENUE |
| 1 | Loan | 01 | € | −10 million | 0.5 million |
| 2 | Loan | 01 | € | −5 million | 0.2 million |
| 3 | Loan | 01 | € | −5 million | 0.2 million |
| 4 | Loan | 10 | € | −20 million | 1.2 million |
| 5 | Loan | 10 | € | −20 million | 1.2 million |
| 6 | Bond | 01 | € | −10 million | 0.6 million |
| 7 | Bond | 01 | € | −5 million | 0.25 million |

Seven accounting objects are illustrated in the example of Table 1. The characteristics data includes a security ID field, an accounting object field, a country field identifying where the customer is located and a currency field identifying a currency represented by the financial key figures. The key figures fields identify values for book value and interest revenue of the respective instruments.

Table 2 illustrates an exemplary pair of rules. As shown the rules each include a single condition and a pair of rule steps. Rule conditions may be more complex than those that are shown here; meaning, individual rules may be contingent upon combinations of multiple characteristics and key figures as deemed appropriate for specific use. Similarly, although a pair of rule steps are shown for each rule, rules may include more or less rule steps as is appropriate for specific use.

TABLE 2

| CONDITION | RULE STEPS |
|---|---|
| AO Type = Loan | Book Value -> Financial Statement Item = 100 (Receivables from Customer) |
| | Interest Revenue -> Financial Statement Item = 300 (Interest Revenue) |
| AO Type = Bond | Book Value -> Financial Statement Item = 150 (Financial Assets and Securities) |
| | Interest Revenue -> Financial Statement Item = 300 (Interest Revenue) |

In Table 2, the rule steps identify copying operations to be performed for specific key figures from matching accounting objects. Thus, for all accounting objects representing loans (the first rule in Table 2), the system copies book value data to an FSI no. 100 and copies interest revenue data to an FSI no. 300. Ultimately, where data is copied to a given FSI from multiple sources, the copied data may be aggregated along other dimensions to simplify further processing.

Five of the accounting objects from Table 1 satisfy the first rule of Table 2. Two of the accounting objects satisfy the second rule. Thus, in this example, FSIs may be created as follows:

TABLE 3

| FSI ID | TITLE | BALANCE |
|---|---|---|
| 100 | Receivables from Customer | −60 million |
| 150 | Financial Assets and Securities | −15 million |
| 300 | Interest Revenue | +4.15 million |

In the example of Table 3, the copied key figure data is aggregated entirely with no differentiation. The FSI may be built with its own characteristics (FSI ID, title) and key figures (balance), which the system may use further in the financial reporting process.

Alternatively, the system may aggregate key figure data along specified dimensions such as country code. An example is shown in Table 4.

TABLE 4

| FSI ID | TITLE | COUNTRY CODE | BALANCE |
|---|---|---|---|
| 100 | Receivables from Customer | 01 | −20 million |
| | | 10 | −40 million |
| 150 | Financial Assets and Securities | 01 | −15 million |
| 300 | Interest Revenue | 01 | 1.75 million |
| | | 10 | 2.4 million |

According to an embodiment, rules themselves may include a field identifying characteristics over which key figure data is aggregated. In the example of Table 4, for example, rules may specify that the aggregation is to be performed across accounting objects having the same country code.

As indicated, financial statements may be prepared from the financial statement items. Further processors (not shown) may be provided to assemble the financial statement items into appropriate financial statements according to conventional processes.

Returning to FIG. 1, in another embodiment, the FSI generator 140 may operate according to cardinality rules 170 that permit the generator 140 to run consistency checks on FSI objects generated from accounting objects. Cardinality rules 170 specify limitations on use of key figure data as specified in rules 160. Cardinality rules 170 help to ensure that operation of a set of rule steps do not inadvertently perform operations that are disruptive to a reporting function for which the rules were defined. For example, a cardinality rule 170 may confirm that a debit-credit key figure is assigned once to a balance sheet FSI. Alternatively such a rule 170 may confirm that a statistical key figure is not assigned to a balance sheet FSI or to a profit/loss statement FSI. The structure and nature of the cardinality rules 170 may be determined by the accounting system for which they are defined; they are grounded in business logic of the respective accounting system.

Typically, rules 160 may be defined when the accounting system 100 is customized for use in a specific installation. That is, the rules 160—the conditions and rule steps therein—are directed to data elements that may be unique for a given user. Because individual accounting objects may satisfy conditions of multiple rules, they are subject to errors, which can lead to erroneous reporting. It is expected that the cardinality rules 170 will be defined prior to customization, will be subject to more rigorous testing and, therefore, will be subject to a lower likelihood of error. Accordingly, the cardinality rules 170 provide a consistency check mechanism to operation of one or more rule sets 160.

Figure 3:
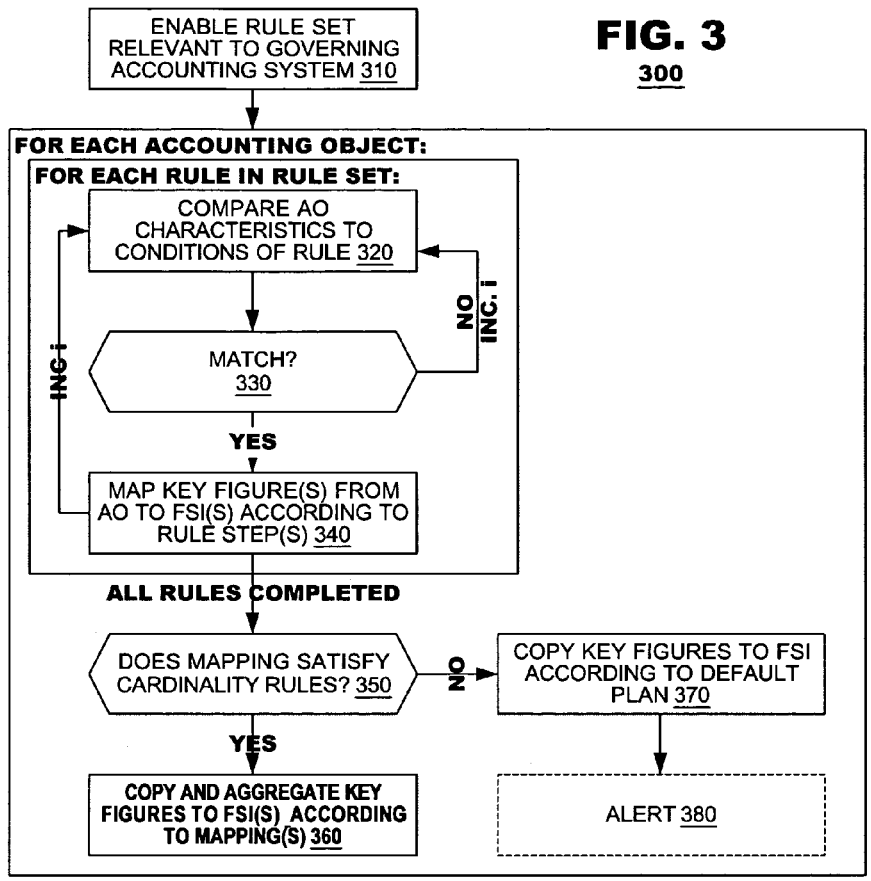
FIG. 3 illustrates a method according to another embodiment of the present invention.
Figure 4:
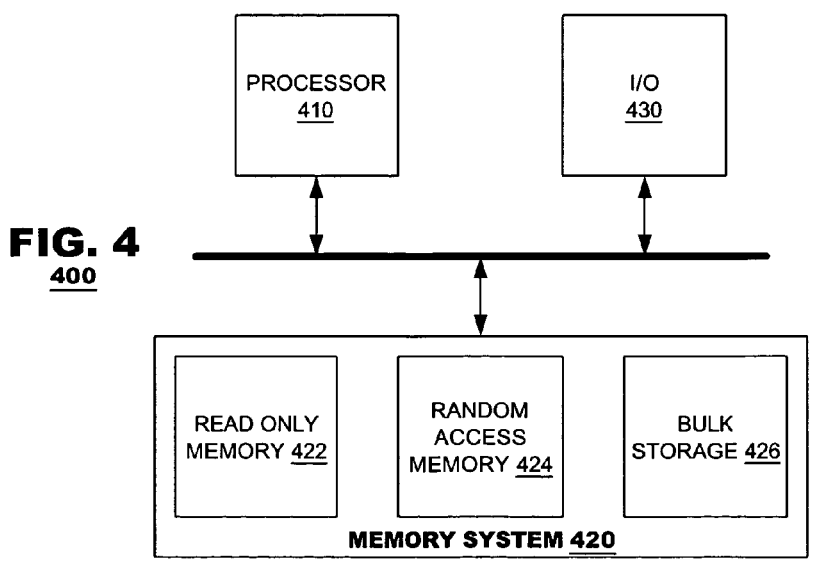
FIG. 4 is a simplified block diagram of a computer system useful with the present invention.

FIG. 3 is a flow diagram of a method 300 according to another embodiment of the present invention. The method 300 may begin by enabling a rule set to use when generating FSIs (box 310). Thereafter, the method 300 may consider each selected accounting object from the database. It may compare the characteristics of the accounting object against conditions of each rule in the rule set (box 320). If there is a match (box 330), the method maps key figures from the accounting object to FSIs as defined in the rule step(s) of the respective rule (box 340). Thereafter, or if there is no match, the method advances to the next rule in the rule set.

Once an accounting object has been considered against all rules in the rule set, the method considers the cardinality rules. It compares the key figure-to-FSI mappings and determines if they satisfy requirements of the cardinality rules (box 350). If so, the method may copy the key figures to the FSIs and aggregate them as described herein. Otherwise, the method 300 may copy the key figures to a default FSI (box 370). When integrating the data from the default FSI into the reporting structure, an operator may check whether the total amount stored in this default FSI exceeds a certain level. If so, it may indicate an error within the rule definitions which can reviewed and corrected before generating a revised set of financial statement items. Minor levels in the default FSI may indicate errors that can be ignored. Optionally, the method 300 may generate an alert (box 380) to indicate to an operator that a cardinality rule was violated during generation of the FSIs.

Functionality of the foregoing embodiments may be provided on various computer platforms executing program instructions. One such platform 300 is illustrated in the simplified block diagram of FIG. 3. There, the platform 300 is shown as being populated by a processor 310, a memory system 320 and an input/output (I/O) unit 330. The processor 310 may be any of a plurality of conventional processing systems, including microprocessors, digital signal processors and field programmable logic arrays. In some applications, it may be advantageous to provide multiple processors (not shown) in the platform 300. The processor(s) 310 execute program instructions stored in the memory system. The memory system 320 may include any combination of conventional memory circuits, including electrical, magnetic or optical memory systems. As shown in FIG. 3, the memory system may include read only memories 322, random access memories 324 and bulk storage 326. The memory system not only stores the program instructions representing the various methods described herein but also can store the data items on which these methods operate. The I/O unit 330 would permit communication with external devices (not shown).

Several embodiments of the present invention are specifically illustrated and described herein. However, it will be appreciated that modifications and variations of the present invention are covered by the above teachings and within the purview of the appended claims without departing from the spirit and intended scope of the invention.

I claim:

1. An automated accounting system comprising:
   a first database to store accounting objects, each accounting object including a first set of numbers representing financial information from a plurality of transactions;
   a second database to store financial statement items;
   a rule array comprising a set of rules customized for an entity;
   and a processor executing a financial statement item generator configured to, for a given plurality of accounting objects: identify whether the accounting objects satisfy a condition of a plurality of rules in the rule array;
   for a plurality of the accounting objects satisfying the condition in at least one rule:
      preliminarily execute a mapping operation in each of the satisfied rules, the mapping operation transitioning the first set of numbers representing financial information from the accounting object to a second set of numbers representing consolidated financial information of a plurality of transactions in a financial statement item;
      aggregate the second sets of numbers mapped to a same financial statement item;
      identify whether the aggregation violates a cardinality rule of the accounting system, the cardinality rule specifying limitations on the aggregation of the second sets of numbers in the same financial statement item based on a comparison between first sets of numbers;
      when the mapping operation does not violate a cardinality rule:
         perform the mapping operation in the rule, and
      otherwise, do not perform the mapping operation in the rule.

2. The system of claim 1, wherein the financial statement item generator further selects the rule array from a plurality of rule arrays.

3. The system of claim 1, where the transitioning of the first set of numbers from the accounting object to the second set of numbers in the financial statement item comprises aggregating a first number associated with the accounting object and a second number associated with the financial statement item.

4. A reporting method for an automated accounting system, the method comprising using a computer processor to:
- identify whether a plurality of accounting objects, each comprising a first set of numbers representing financial information from a plurality of transactions, satisfy a condition of a plurality of rules in a rule array;
- for a plurality of the accounting objects satisfying the condition in at least one rule:
  - preliminarily execute a mapping operation using the computer processor, in each of the satisfied rules, the mapping operation transitioning the first set of numbers representing financial information from the accounting object to a second set of numbers representing consolidated financial information of a plurality of transactions in a financial statement item;
  - aggregate using the computer processor, the second sets of numbers mapped to a same financial statement item;
  - identify whether the aggregation violates a cardinality rule of the accounting system, the cardinality rule specifying limitations on the aggregation of the second sets of numbers in the same financial statement item based on a comparison of first sets of numbers;
  - when the mapping operation does not violate a cardinality rule:
    - perform the mapping operation in the rule, and
  - otherwise, do not perform the mapping operation in the rule.

5. The reporting method of claim 4, where the processor further selects the rule array from a plurality of rule arrays.

6. The reporting method of claim 4, where the transitioning of the first set of numbers from the accounting object to the second set of numbers in the financial statement item comprises aggregating a first number associated with the accounting object and a second number associated with the financial statement item.

7. The reporting method of claim 4, where the first set of numbers is transitioned to a plurality of second sets of numbers in a plurality of financial statement items.

8. The reporting method of claim 4, where the processor further generates a financial report based on the second set of numbers in the financial statement item.

9. A computer-readable storage medium storing instructions which, when executed by a computer processor, cause the processor to perform a method comprising:
- identify whether a plurality of accounting objects, each comprising a first set of numbers representing financial information from a plurality of transactions, satisfy a condition of a plurality of rules in a rule array;
- for a plurality of the accounting objects satisfying the condition in at least one rules:
  - preliminarily execute a mapping operation in each of the satisfied rules, the mapping operation transitioning the first set of numbers representing financial information from the accounting object to a second set of numbers representing consolidated financial information of a plurality of transactions in a financial statement item;
  - aggregate the second sets of numbers mapped to a same financial statement item;
  - identify whether the aggregation violates a cardinality rule of the accounting system, the cardinality rule specifying limitations on the aggregation of the second sets of numbers in the same financial statement item based on a comparison of first sets of numbers;
  - when the mapping operation does not violate a cardinality rule:
    - perform the mapping operation in the rule, and
  - otherwise, do not perform the mapping operation in the rule.

10. The computer-readable storage medium of claim 9, where the rule array is selected from a plurality of rule arrays.

11. The computer-readable storage medium of claim 9, where the transitioning of the first set of numbers from the accounting object to the second set of numbers in the financial statement item comprises aggregating a first number associated with the accounting object and a second number associated with the financial statement item.

12. The computer-readable storage medium of claim 9, where the first set of numbers is transitioned to a plurality of second sets of numbers in a plurality of financial statement items.

13. The computer-readable storage medium of claim 9, where the method further comprises generating a financial report based on the second set of numbers in the financial statement item.

* * * * *